(12) United States Patent
Shetty et al.

(10) Patent No.: US 6,954,931 B2
(45) Date of Patent: Oct. 11, 2005

(54) RESOURCE ALLOCATION

(75) Inventors: Ravindra K. Shetty, Bangalore (IN); Venkatesan Thyagarajan, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 702 days.

(21) Appl. No.: 09/904,749

(22) Filed: Jul. 13, 2001

(65) Prior Publication Data

US 2003/0014293 A1 Jan. 16, 2003

(51) Int. Cl.[7] .................................................. G06F 9/46
(52) U.S. Cl. ........................................ 718/104; 705/8
(58) Field of Search ............................... 718/104; 705/8

(56) References Cited

U.S. PATENT DOCUMENTS

| | | | | |
|---|---|---|---|---|
| 5,195,170 A | * | 3/1993 | Eberhardt .................... | 706/19 |
| 5,648,912 A | * | 7/1997 | Narayanan et al. ........... | 716/18 |
| 5,963,910 A | | 10/1999 | Ulwick .......................... | 705/7 |
| 5,963,911 A | * | 10/1999 | Walker et al. ................ | 705/7 |
| 6,112,126 A | | 8/2000 | Hales et al. | |
| 6,404,380 B2 | * | 6/2002 | Poore, Jr. ..................... | 342/96 |
| 2001/0039581 A1 | * | 11/2001 | Deng et al. ................ | 709/226 |

OTHER PUBLICATIONS

Buslaeva, L.T. Stabvility of a routing optimization algorithm, Sep.–Oct., 1997.*
Dell' Amico, M., Lodi, A., Martello, S., Efficient algorithms and codes for k–cardinality assignment problems, Jun. 2001, Dipt. di Sci. e Metodi dell'Ingegneria, Modena Univ.*
Mawijn, W.M; Dorhout, B., On the expected number of assignments in reduced matrices for the linear assignment problem, Dec. 1989.*
Taha, H.A., *Operations Research, An Introduction*, Prentice Hall, Upper Saddle River, New Jersey, ISBN, 0132729156, pp. 195–202, (1997).

* cited by examiner

*Primary Examiner*—Lewis A. Bullock, Jr.
*Assistant Examiner*—Camquy Truong
(74) *Attorney, Agent, or Firm*—Schwegman, Lundberg, Woessner & Kluth, P.A.

(57) ABSTRACT

Computer-implemented methods for allocating resources to items are provided. One or more assignment scores for each item/resource pair are determined by applying one or more application-specific strategies to each item/resource pair using game theory. A cost matrix is created by first summing the assignment scores for each item/resource pair and then multiplying each assignment score sum by an assignment cost associated with assignment a particular resource to a particular item. Finally, an assignment solution is found by applying a Hungarian method to the cost matrix.

12 Claims, 7 Drawing Sheets

| | RESOURCE$_1$ | RESOURCE$_2$ | · · · | RESOURCE$_j$ | RESOURCE$_j$ |
|---|---|---|---|---|---|
| ITEM 1 | $C_{11}$ | $C_{12}$ | | | |
| ITEM 2 | $C_{21}$ | $C_{22}$ | | | |
| ⋮ | | | | | |
| ITEM i | | | | $C_{ij}$ | |
| ITEM n | | | | | $C_{nk}$ |

400

| | BUFFER 1 | BUFFER 2 | BUFFER 3 | BUFFER 4 | BUFFER 5 |
|---|---|---|---|---|---|
| STRATEGY 1 | 0.6 | 0.8 | 0.9 | 0.6 | 0.9 |
| STRATEGY 2 | 0.8 | 0.7 | 0.0 | 0.9 | 0.9 |
| STRATEGY 3 | 0.0 | 0.9 | 0.8 | 0.0 | 0.8 |
| STRATEGY 4 | 0.6 | 0.6 | 0.8 | 0.0 | 0.9 |
| TOTAL | 2 | 3 | 2.5 | 1.5 | 3.5 |

402

| | BUFFER 1 | BUFFER 2 | BUFFER 3 | BUFFER 4 | BUFFER 5 |
|---|---|---|---|---|---|
| STRATEGY 1 | 0.8 | 0.6 | 0.95 | 0.75 | 0.35 |
| STRATEGY 2 | 0.1 | 0.9 | 0.85 | 0.75 | 0.65 |
| STRATEGY 3 | 0.7 | 0.85 | 0.95 | 0.45 | 0.15 |
| STRATEGY 4 | 0.9 | 0.85 | 0.95 | 0.95 | 0.95 |
| TOTAL | 2.5 | 3 | 3.7 | 2.8 | 2.1 |

|        | BUFFER 1 | BUFFER 2 | BUFFER 3 | BUFFER 4 | BUFFER 5 | ROW MINIMUM |
|--------|----------|----------|----------|----------|----------|-------------|
| ITEM 1 | 3        | 8        | 2        | 10       | 3        | 2           |
| ITEM 2 | 8        | 7        | 2        | 9        | 7        | 2           |
| ITEM 3 | 6        | 4        | 2        | 7        | 5        | 2           |
| ITEM 4 | 8        | 4        | 2        | 3        | 5        | 2           |
| ITEM 5 | 9        | 10       | 6        | 9        | 10       | 6           |

704

|                | BUFFER 1 | BUFFER 2 | BUFFER 3 | BUFFER 4 | BUFFER 5 |
|----------------|----------|----------|----------|----------|----------|
| ITEM 1         | 3-2=1    | 8-2=6    | 2-2=0    | 10-2=8   | 3-2=1    |
| ITEM 2         | 6        | 5        | 0        | 7        | 5        |
| ITEM 3         | 4        | 2        | 0        | 5        | 3        |
| ITEM 4         | 6        | 2        | 0        | 1        | 3        |
| ITEM 5         | 3        | 4        | 0        | 3        | 4        |
| COLUMN MINIMUM | 1        | 2        | 0        | 1        | 1        |

706

|        | BUFFER 1 | BUFFER 2 | BUFFER 3 | BUFFER 4 | BUFFER 5 |
|--------|----------|----------|----------|----------|----------|
| ITEM 1 | 0        | 4        | 0        | 7        | 0        |
| ITEM 2 | 5        | 3        | 0        | 6        | 4        |
| ITEM 3 | 3        | 0        | 0        | 4        | 2        |
| ITEM 4 | 5        | 0        | 0        | 0        | 2        |
| ITEM 5 | 2        | 2        | 0        | 2        | 3        |

FIG. 7A

|  | BUFFER 1 | BUFFER 2 | BUFFER 3 | BUFFER 4 | BUFFER 5 |
|---|---|---|---|---|---|
| ITEM 1 | 0 | 4 | 0+2=2 | 7 | 0 |
| ITEM 2 | 5-2=3 | 3-2=1 | 0 | 6-2=4 | 4-2=2 |
| ITEM 3 | 3 | 0 | 0+2=2 | 4 | 2 |
| ITEM 4 | 5 | 0 | 0=2=2 | 0 | 2 |
| ITEM 5 | 2-2=0 | 2-2=0 | 0 | 2-2=0 | 3-2=1 |

708

|  | BUFFER 1 | BUFFER 2 | BUFFER 3 | BUFFER 4 | BUFFER 5 |
|---|---|---|---|---|---|
| ITEM 1 | 0 | 4 | 2 | 7 | 0 |
| ITEM 2 | 3 | 1 | 0 | 4 | 2 |
| ITEM 3 | 3 | 0 | 2 | 4 | 2 |
| ITEM 4 | 5 | 0 | 2 | 0 | 2 |
| ITEM 5 | 0 | 0 | 0 | 0 | 1 |

| ITEMS | BUFFERS | COST (UNITS) |
|---|---|---|
| ITEM 1 | BUFFER 5 | 3 |
| ITEM 2 | BUFFER 3 | 2 |
| ITEM 3 | BUFFER 2 | 4 |
| ITEM 4 | BUFFER 4 | 3 |
| ITEM 5 | BUFFER 1 | 9 |
| TOTAL COST INVOLVED |  | 21 |

FIG. 8

RESOURCE ALLOCATION

FIELD OF THE INVENTION

The present invention relates generally to resource allocation. More specifically, the present invention relates to methods and systems for allocating or scheduling a wide variety of processes or outputs competing for a resource.

BACKGROUND OF THE INVENTION

Resource allocation has long been an important aspect of effective business management in many different industries. Many industries have long felt the need to coordinate and schedule the use of resources in attempting to optimize business goals. Prior art approaches to resource allocation include methods such as manual handling, Linear Programming ("LP"), Quadrature Programming ("QP"), Mixed Integer Programming ("MIP"), and Static Constraint-Graph methods. However, prior art approaches suffer from one or more drawbacks including unnecessary time delays, under utilization of resources, and increased inventory. These drawbacks frequently yield cost ineffective solutions for business goal optimization. Thus, there continues to be a need for improved approaches to allocating resources.

SUMMARY OF THE INVENTION

The present invention addresses one or more of the issues discussed above by providing methods and systems that can be advantageously utilized to allocate or schedule the use of a wide variety of resources. The present invention finds utility in a wide variety of applications. For example, the present invention can be advantageously utilized for scheduling of processes in chemical refineries and other manufacturing operations, scheduling of airline crews, supply chain management, work flow management, distributed power management system, and decision making intelligent machines for self scheduling.

In a first embodiment, the present invention provides computer-implemented methods for allocating resources to items. Methods according to the present invention first determine one or more assignment scores for each item/resource pair by applying one or more application-specific strategies to each item/resource pair. A cost matrix is created by first summing the assignment scores for each item/resource pair and then multiplying each assignment score sum by an assignment cost associated with assignment a particular resource to a particular item. Finally, an assignment solution is found by applying the Hungarian method to the cost matrix. In a second embodiment, the present invention provides a computer-readable medium having computer-executable instructions for performing methods of the present invention.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 illustrates examples of applying application strategies according to the present invention.

FIG. 7A and FIG. 7B illustrate an example of applying the Hungarian method according to the present invention.

FIG. 8. illustrates an example of an assignment solution according to the present invention.

DETAILED DESCRIPTION OF THE INVENTION

Figure 1:
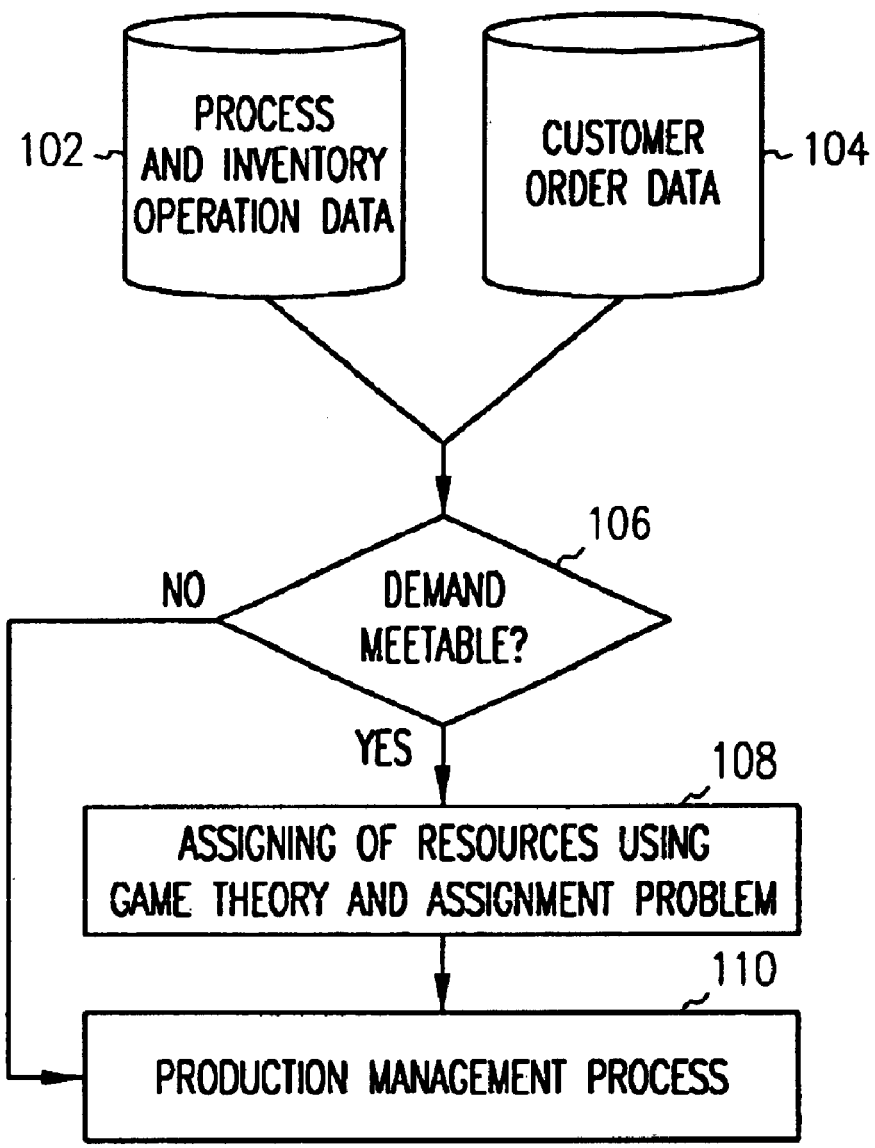
FIG. 1 illustrates an approach according to the present invention used to find a solution.

In the following detailed description of the present invention, reference is made to the accompanying Drawings, which form a part hereof, and in which are shown by way of illustration specific embodiments in which the present invention may be practiced. It should be understood that other embodiments may be utilized and structural changes may be made without departing from the scope of the present invention.

The present invention provides methods useful for resource allocation in situations when overall customer demand can be met. That is, the present invention assumes sufficient resources exist to meet overall customer demand. Typically, the decision as to whether the customers' demands can be met is made after analyzing the customer order data as well as process and inventory operations data. Precisely how the decision of whether customer demand can be met is not critical to the present invention.

The present invention will be explained in the context of storing products and byproducts into storage tanks as frequently occurs in the petrochemical industry. However, it should be understood that the present invention is not limited by this application, but can be advantageously used in other applications.

Frequently, manufacturers in the petrochemical industry have large numbers of storage tanks for storing products and byproducts of various processes. These storage tanks are sometimes collectively referred to as tank farms. The tanks are resources that need to be allocated in order to manufacture all the products needed to meet customer demand.

For example, the production of lubricating oil may require a number of process steps. The first step may require distillation of a raw material and this distillation may result in four different byproducts being formed. Each of these four different byproducts would need to be stored in four different storage tanks. Processing of these four byproducts may produce additional products or byproducts that also need to be stored in storage tanks. Each time a product or byproduct is produced and needs to be stored; a decision must be made as to which storage tank to use to store the product or byproduct. As the number of products and byproducts needing storage increases, the decisions of choosing which storage tanks to use becomes increasingly complex and difficult. At the same time, which storage tank is used for any product or byproduct may have a tremendous impact on the overall efficiency of use for the entire tank farm. Accordingly, it is extremely important to make good decisions for the storage of each product or byproduct.

The present invention provides for effective decision-making leading to efficient use of resources (for example, storage tanks in a tank farm). In a first embodiment, the present invention provides computer-implemented methods useful for decision-making that is effective for allocating resources. In a second embodiment, the present invention provides computer-readable media having computer-executable instructions for performing methods of the present invention.

Methods of the present invention can be implemented to execute on conventional computer hardware in conjunction with conventional computer system software. For example, methods of the present invention have been advantageously implemented in the C programming language and executed on a hardware platform running the Windows NT operating system. Additionally, methods of the present invention can be advantageously implemented on systems comprising multiple computers communicating over a network, such as a local area network, a wide area network, or the Internet. One of ordinary skill in computer programming will be able to implement the present invention without undue experimentation.

FIG. 1 shows a flowchart illustrating an embodiment of the present invention. In FIG. 1, method 100 uses information obtained from Process and Inventory Operation Data 102 and Customer Order Data 104 to determine whether the overall customers' demand can be met 106. If the overall customers' demand can be met then the assigning of resources 108 is performed in accordance with the present invention use of Game theory and Assignment problem. The results of the assigning of resources process 108 are provided to a production management process 110.

Figures 2, 3:
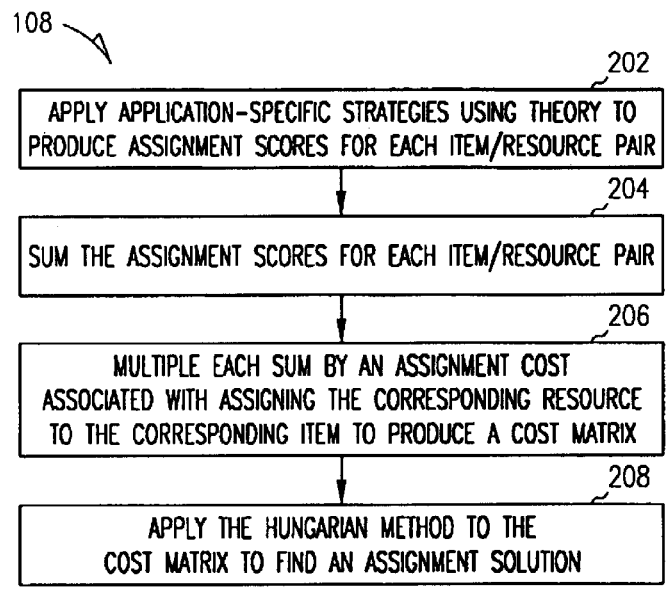
FIG. 2 illustrates the novel methodology using Game theory and assignment problem in the present invention.
FIG. 3 illustrates an example of a cost matrix according to the present invention.

FIG. 2 shows a more detailed example of the assigning of resources process 108. In step 202, assignment scores for each item/resource pair are produced by applying application-specific strategies. In step 204, the assignment scores for each item/resource pair are summed. In step 206, each sum is multiplied by an assignment cost associated with assigning the corresponding resource to the corresponding item, producing a cost matrix. As shown in step 208, the Hungarian method is applied to the cost matrix to determine an optimal assignment of resources (that is, an assignment solution) to items based on the cost matrix.

An example of a cost matrix 300 is shown in FIG. 3. Each element $C_{ij}$ of cost matrix 300 represents the overall cost of assigning resource j to item i. Each element $C_{ij}$ is calculated in the following manner. For each item/resource pair in the matrix, one or more scores are generated by applying one or more application-specific strategies. For each item/resource pair, all the scores for the pair are summed and then the sum is multiplied by an application cost to produce the final cost element $C_{ij}$ for the pair.

The application-specific strategies can be viewed as criteria for determining how valuable or desirable it is to assign a particular resource to a particular item. The score resulting from applying the strategy represents the value based on applying that strategy or criteria. A lower score represents a higher value or a more desirable assignment than a higher score. Thus, the lowest score attainable represents the most valuable score that can be obtained by applying a particular strategy. Similarly, the highest score attainable represents the lowest value of applying a particular strategy. In a preferred embodiment, the minimum score (highest value) is zero (0) and the maximum score (lowest value) is one (1). In some embodiments, all the strategies will have the same minimum score and same maximum score. For example, if the minimum score attainable by applying a first strategy is zero, then every strategy in such an embodiment will have a minimum attainable strategy of zero. Similarly, if the maximum score attainable by applying a first strategy is 1, then every strategy will have a maximum attainable strategy of 1.

In applications where the resources to be assigned are buffers, examples of strategies include strategies based on the storage-level of each buffer, set-up time requirements, priority of storing items in buffers, and compatibility of multiple items in a single buffer. A buffer can be anything used to stores items. For example, in the petrochemical industry storage tanks are a type of buffer used to store reactants, products, byproducts, etc. In the airline industry, airplanes are buffers storing passengers and crew. Other applications of the present invention include distributed power management systems and decision-making intelligent machines for scheduling.

Examples of application-specific strategies based on the storage-level of each buffer include "leave-minimum-gap strategies" and "leave-maximum-gap strategies." In a leave-minimum-gap strategy the objective or strategy is to store items in the buffers in a manner that will leave the smallest amount of space left in the buffer. For example, assume a quantity Q of item I is to be stored in either buffer B1 or buffer B2. If B1 is empty then storing quantity Q of item I in B1 would leave the most space, or maximum gap, left. Since the objective is to leave a minimum gap, assigning B1 to quantity Q of item I would receive the minimum score. If, for example, B2 had exactly enough space to fit quantity Q of item I, then assigning B2 to quantity Q of item I might receive a maximum score. Conversely, if a leave-maximum-gap were being used then assigning B1 would receive a maximum score and assigning B2 might receive a minimum score.

Another strategy useful in buffer-related applications is a strategy based on set-up costs. Frequently, a buffer will need to undergo some preparations before an item can be stored in the buffer. If very little preparation is required, the buffer can be assigned a low score. Again, a low score represents a valuable resource assignment based on that strategy or criteria. If no preparations at all are needed, that item/resource pair can receive a minimum (most valuable) score based on a set-up cost strategy.

For example, if the resources to be assigned are storage tanks, storing an item I1 in a storage tank may require the tank to be cleaned before item I1 can be stored. This could happen, for example, if I1 is a chemical that is incompatible with a chemical previously stored in the tank. Storing item I1 in the tank would require any remaining residue of the previous item to be removed before item I1 could be stored. Accordingly, assigning the storage tank resource to item I1 would receive a score depending on how much preparation or set-up was necessary before item I1 could be stored. If minimal preparation is required, the assignment is highly desirable or highly valuable and the potential assignment of that tank to item I1 receives a low score. On the other hand, if a significant amount of preparation would be necessary to store item I1 into the storage tank then the potential assignment of that tank to item I1 is not as desirable and would receive a higher score.

Sometimes two or more items of different types can be stored in the same buffer if they are compatible with each other. Accordingly, storing item I1 in a buffer containing item I2 would be undesirable if I1 and I2 are incompatible with each other and would receive a high score. However, if I1 and I2 were compatible with each other, then storing I1 in a buffer containing I2 would receive a lower score. For example, I1 and I2 could be different chemicals that need to be stored in storage tanks. If I1 and I2 would chemically react with each other to form a third chemical or if I1 and I2 were difficult to separate when mixed, then storing them in the same tank would be highly undesirable and would receive a high score based on a compatibility criteria or strategy. On the other hand, if I1 and I2 were non-miscible with each other and could be easily separated, storing I1 in a tank that already has I2 in it would be more desirable and receive a lower score.

Frequently, items to be stored in buffers will have some basic priorities defined for them relative to other items to be stored. Generally, it is desirable to give preference to storing items with higher priorities over storing items with lower priorities. Accordingly, another useful strategy involves assigning lower scores to items having high priorities and higher scores to items having lower priorities.

According to the present invention, a score is assigned to each item/resource pair for each criteria or strategy applied. These scores can be referred to as strategy scores. All the strategy scores resulting from applying all the strategies are summed for each item/resource pair. Thus, each resource to be assigned will have a summation score for each item needing a resource. An example is shown in FIG. 4. In FIG. 4, matrix 400 is the result of applying four different strategies to Item 1 and five different buffer resources. As shown in matrix 400, the four strategy scores for the Item 1/Buffer 1 pair have been summed and the sum is equal to 2. Similarly, the four strategies have been applied to the Item 1/Buffer 2 pair yielding four strategy scores and the result of summing the four scores is 3. Matrix 402 is created in the same manner except that Item 2 is used instead of Item 1.

In this manner, each item/resource pair has a sum associated with it that is calculated by summing the strategy scores resulting from applying application-specific strategies to each item/resource pair. Matrix 500 is an example of the sums resulting from applying Strategies 1–4 used in matrix 400 and matrix 402 to Items 1–5 and Buffers 1–5. In matrix 500, the row for Item 1 corresponds to the totals of matrix 400 and the row for Item 2 corresponds to the totals of matrix 402.

Figure 5:
FIG. 5 illustrates an example of producing a cost matrix from assignment score sums and assignment costs according to the present invention.

According to the present invention, each of these sums is multiplied by the cost of assigning the corresponding resource to the corresponding item. These costs can be referred to as assignment costs. In FIG. 5, matrix 502 shows assignment costs of assigning each resource to each item. For example, matrix 502 shows that assigning Buffer 1 to Item 1 would have a corresponding assignment cost of 1.5 and assigning Buffer 2 to Item 1 would have a corresponding assignment cost of 2.66. The cost of assigning resources to items can be express in monetary units, time units, space units, etc. For example, if maximizing profit were an overall goal, then a particular application might express assignment costs in monetary units. However, if minimizing production time were an overall goal, then a particular application might express assignment costs in units of time. Additionally, another application might use assignment costs that express an overall effective cost that takes into consideration a combination of financial cost, time, space, etc.

Multiplying each of the strategy score sums by the corresponding assignment cost results in the production of a cost matrix. Matrix 504 in FIG. 5 is an example of such a cost matrix. As shown in matrix 504, the overall cost associated with assigning Buffer 1 to Item 1 is 3. This cost value was produce by multiplying the corresponding strategy score sum of 2 shown in matrix 500 and the corresponding assignment cost of 1.5 shown matrix 502. Similarly, the overall cost associated with assigning Buffer 2 to Item 1 (that is, 8) was derived by multiplying the corresponding strategy score (that is, 3) and the corresponding assignment cost (that is, 2.66).

Once a cost matrix has been created, one or more assignment solutions can be found by applying the Hungarian method to the cost matrix. The Hungarian method is a known algorithm for solving assignment problems using an n×n cost matrix. In applying the Hungarian method, there is no loss of generality in assuming that the number of resources always equals the number of items because fictitious resources or fictitious items can always be added to effect the same result. For example, assume that for each item needing a resource there exists a row in the cost matrix and that for each resource available there exists a column in the cost matrix. If there are more items than resources, one or more columns can be added to the matrix to make it an n×n matrix. Similarly, if there are more resources than items, one or more rows can be added to the matrix to make it an n×n matrix.

Figure 6:
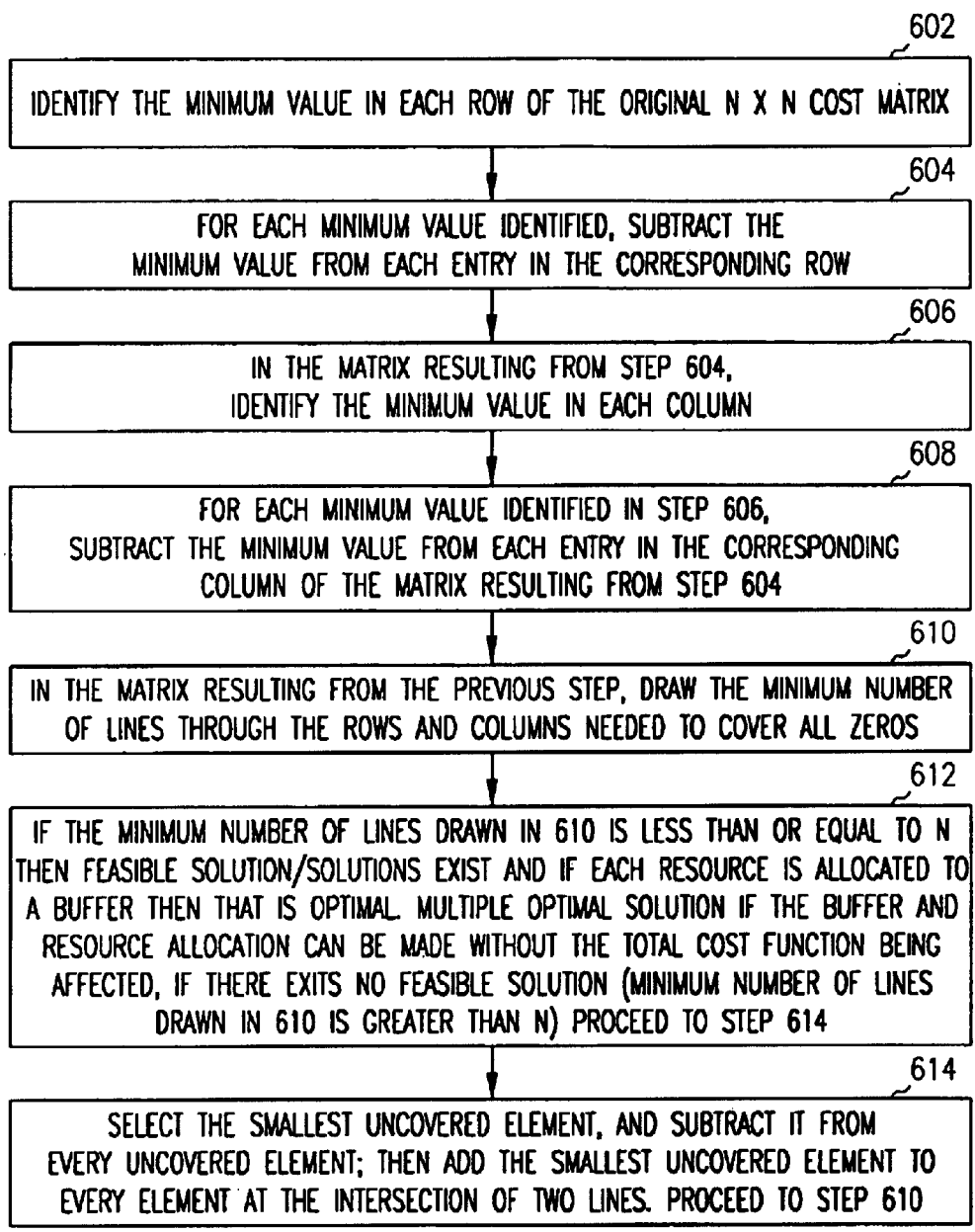
FIG. 6 illustrates a method according to the present invention.

A flowchart illustrating an example of the Hungarian method is shown in FIG. 6. FIG. 7 illustrates an example of applying the Hungarian method to the cost matrix 504. FIG. 8 shows an assignment solution resulting from applying the Hungarian method to cost matrix 504.

The Hungarian method works by first identifying the minimum value in each row of a cost matrix and subtracting that minimum value from all the entries in the corresponding row. This is illustrated in step 602 and step 604 of FIG. 6 as well as matrix 702 and matrix 704 of FIG. 7A. Next, the minimum value in each column of the matrix resulting from the previous step is identified and subtracted from all the entries in the corresponding column. This is illustrated in step 606 and step 608 as well as matrix 704 and matrix 706. Next, the minimum number of lines needed to cover all zeros is draw through the rows and columns. This is illustrated in step 610 and matrix 706. In matrix 706 four lines are drawn—one each through the three rows corresponding to Item 1, Item 3, and Item 4, and one through the column corresponding to Buffer 3. If the minimum number of lines drawn to cover all the zeros in an n×n matrix is equal to n, then one or more assignment solutions if identifiable and one can be chosen. If the minimum number of lines drawn is less than or equal to n, then proceed to the next step as illustrated in step 612. In matrix 706, the number of lines drawn is four. Since n is equal to five, the number of lines drawn is less than n. Obviously a solution is feasible, but not optimal. Thus, no assignment solution is identified and the Hungarian method proceeds to the next step. As shown in step 614, the next step is to select the smallest uncovered element of the cost matrix, subtract it from every uncovered element, and add it to every element at the intersection of two lines. This step is illustrated in matrix 708 of FIG. 7B, where the smallest uncovered element is 2. At this point in the application of the Hungarian method according to the present invention, step 610 is repeated to check for an assignment solution. Steps 610, 612, 614 are repeated until an assignment solution is identified.

An assignment solution is chosen by assigning each resource to an item where the cost element in the cost matrix for that item/resource pair is zero. More than one assignment solution may be available for a corresponding cost matrix. Matrix 710 shows the resulting cost matrix after applying the Hungarian method to cost matrix 504. FIG. 8, shows an assignment solution chosen using cost matrix 710.

The above description illustrates preferred embodiments that achieve the features and advantages of the present invention. It is not intended that the present invention be limited to the illustrated embodiments. Modifications and substitutions to process elements and data structures can be made without departing from the spirit and scope of the present invention. Accordingly, the invention is not to be considered as being limited by the foregoing description and drawings, but is only limited by the scope of the appended claims.

What is claimed is:

1. A computer-implemented method for assigning resources to items, comprising:
   identifying one or more assignment strategies for assigning one or more resources to one or more items;
   for each identified assignment strategy, determining an assignment score for each item/resource pair;
   summing the assignment scores for each item/resource pair;
   multiplying each assignment score sum by an assignment cost associated with the sum's corresponding item/resource pair to produce a cost matrix; and
   applying a Hungarian method to the cost matrix.

2. The method according to claim 1, wherein the resources are buffers.

3. The method according to claim 2, wherein at least one of the assignment strategies is chosen from the group consisting of strategies based on a storage level of the buffers, strategies based on a set-up time requirements of the buffers, strategies based on priorities of storing items in the buffers, and strategies based on compatibility of multiple items in a single buffer.

4. The method according to claim 2, wherein all of the assignment strategies are chosen using Game theory from the group consisting of strategies based on a storage level of the buffers, strategies based on a set-up time requirements of the buffers, strategies based on priorities of storing items in the buffers, and strategies based on compatibility of multiple items in a single buffer.

5. The method according to claim 1, wherein the resources are storage tanks.

6. A computer-readable medium having computer-executable instructions for performing a method comprising:
   identifying one or more assignment strategies for assigning one or more resources to one or more items;
   for each identified assignment strategy, determining an assignment score for each item/resource pair;
   summing the assignment scores for each item/resource pair;
   multiplying each assignment score sum by an assignment cost associated with the sum's corresponding item/resource pair to produce a cost matrix; and
   applying a Hungarian method to the cost matrix.

7. The method according to claim 6, wherein the resources are buffers.

8. The method according to claim 7, wherein at least on of the assignment strategies is chosen from the group consisting of strategies based on a storage level of the buffers, strategies based on a set-up time requirements of the buffers, strategies based on priorities of storing items in the buffers, and strategies based on compatibility of multiple items in a single buffer.

9. The method according to claim 7, wherein all of the assignment strategies are chosen from the group consisting of strategies based on a storage level of the buffers, strategies based on a set-up time requirements of the buffers, strategies based on priorities of storing items in the buffers, and strategies based on compatibility of multiple items in a single buffer.

10. The method according to claim 6, wherein the resources are storage tanks.

11. The method according to claim 2 wherein the buffers comprise airplanes.

12. The method according to claim 1 wherein the cost of assigning resources to items is measured in monetary units, time units or space units.

* * * * *